United States Patent [19]

Sumner

[11] Patent Number: 4,745,957

[45] Date of Patent: May 24, 1988

[54] TIRE BREAKER BELTS AND METHOD OF MAKING

[75] Inventor: Anthony J. M. Sumner, Near Stratford-on-Avon, England

[73] Assignee: Apsley Metals Limited a British Company, United Kingdom

[21] Appl. No.: 731,725

[22] Filed: May 8, 1985

[30] Foreign Application Priority Data

May 22, 1984 [GB] United Kingdom ............... 8413093

[51] Int. Cl.$^4$ .......................... B60C 9/22; B60C 9/17
[52] U.S. Cl. .................................. 152/531; 152/526; 152/532; 156/117
[58] Field of Search ............... 156/117, 121, 397, 172, 156/101, 177, 169, 425, 439, 440, 181, 441, 126, 130; 152/526, 531, 533, 530, 532, 527

[56] References Cited

U.S. PATENT DOCUMENTS

| | | | |
|---|---|---|---|
| 1,746,948 | 2/1930 | King | 156/181 |
| 3,018,814 | 1/1962 | Saint-Paul | 152/527 |
| 3,183,135 | 3/1965 | Berquist | 156/126 |
| 3,360,410 | 12/1967 | Roomanin | 156/172 |
| 3,375,150 | 3/1968 | Alexeff | 156/117 |
| 3,606,921 | 9/1971 | Grawey | 152/331 |

FOREIGN PATENT DOCUMENTS 2361230 10/1978 France .
1048099 11/1966 United Kingdom .

Primary Examiner—Michael Ball
Attorney, Agent, or Firm—Stevens, Davis, Miller & Mosher

[57] ABSTRACT

A tire breaker belt comprises a core ply preferably comprising rubberized cords extending longitudinally of the belt. One or more encasing plies are wrapped around the core ply. The cords of the encasing ply or plies extend at an acute angle to the length of the belt.

The belt may be formed directly as an annulus or in a long length which is cut to a shorter length and subsequently wrapped around a carcass.

7 Claims, 3 Drawing Sheets

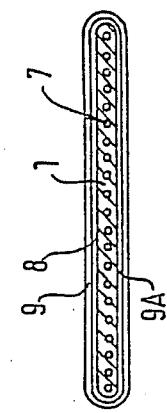
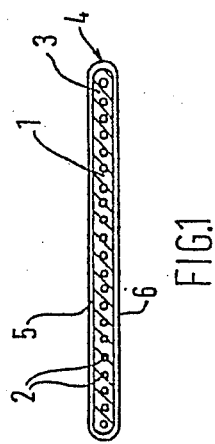
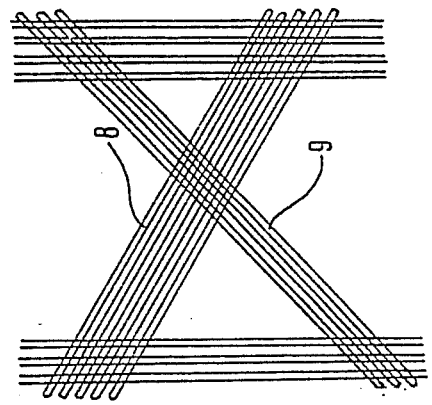
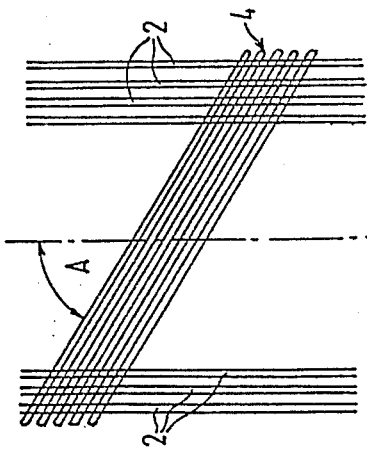

TIRE BREAKER BELTS AND METHOD OF MAKING

This invention relates to tires and in particular to a tread reinforcement or breaker belt for radial tires. It provides a new breaker belt and a method of manufacture for said breaker belt.

Breaker belts are primarily designed to provide the required properties in the finished tire but due to conventional building processes the design is invariably slightly compromised to allow assembly. Especially in the case of large-section low-profile tires reinforcement cords which extend substantially in the circumferential direction (i.e. at 0° to the tread centreline) are desirable in the breaker belt and these are particularly difficult to incorporate at present. Indeed special reinforcement cords having an initial degree of stretch have been developed to allow manufacture although these are expensive and not entirely satisfactory.

Another result of conventional tire building processes is that the plies in the breaker laid at bias angles (usually of the order of 22°) are assembled separately to the longitudinal (i.e. 0°) reinforcement ply or plies and the breaker belt is in fact assembled layer by layer onto the pre-assembled radial carcass. This makes tire breaker assembly a lengthy process with consequent cost penalties.

Tire building processes have been proposed which do not require breaker expansion and an object of the present invention is to take advantage of such processes and provide a new breaker belt which obviates the above difficulties and provides improved properties in the finished tire.

According to one aspect of the present invention a breaker belt for a tire comprises a reinforced elastomeric material core ply having a width slightly less than the width of the breaker belt and an encasing ply which extends around the core ply and is formed by a continuous winding of tire cord reinforcement material all embedded in elastomeric material.

The core ply is preferably reinforced by reinforcement cords extending longitudinally of the core ply such that the cords are at 0° to the centreline of the tread of a finished tire. The said longitudinally extending cores may be equally spaced-apart across the width of the core ply or may be unevenly spaced to provide, for example, reinforcement cords in the edge regions only of the ply. The reinforcement cords may be separate cords arranged side-by-side or may, in the case of the breaker belt being a discrete annular component, be formed from a single cord which is wound around the component.

The encasing ply may be a winding of a single tyre reinforcement cord or a winding in the form of a narrow strip formed by a small number of parallel reinforcement cords.

Preferably the cords of the encasing ply are wound so as to lie at an acute angle to the centreline of the breaker belt (i.e. at an acute angle to the longitudinal direction.) It will be seen that in the case of a single layer encasing ply the cords above the core ply are at an acute angle to the opposite side of the centreline to the cords below the core ply. The encasing ply may have more than one cord thickness being formed by a second winding of cord in the same direction as the first winding or more preferably by a second winding in the opposite direction around the core ply to the first winding. The angles of the two windings may be the same or different.

The reinforcement cords may be of any of the known tires or materials in the tyre art but preferably low extensibility cords are used particularly for the core ply to obtain maximum benefit from the invention. Steel cords or similar materials such as aromatic polyamides or glass filaments are particularly suitable.

The resulting breaker belt has the advantage over conventional belts that there are no cut cord ends at the edges of the breaker belt (except in some cases at a single cord end at the start and one at the finish of the winding) and there are no regions across the width of the belt where there is additional reinforcement material. These points of weakness occur in conventional cut-edge and folded edge breaker belts respectively. Furthermore the breaker belts of the invention having 0° reinforcement cords in the core ply have the 0° cords integral with the encasing cords to provide a pre-assembled breaker belt.

Additional breaker plies may be used above or below the breaker belt, these may be at 0° or acute angles as desired.

According to another aspect of the present invention a method of manufacture for a breaker belt comprises preparing a reinforced elastomeric material core ply having a width slightly less than the width of the breaker belt, winding a continuous tire cord reinforcement around the core ply to form an encasing ply and consolidating the said plies to form breaker belt material.

The method preferably incorporates two winding operations to provide two encasing plies. The winding may be carried out at an angle of substantially 90° to the length of the breaker belt but generally the winding is at an acute angle to the centreline of the breaker belt.

The core ply may be supported as a straight length and the winding carried out around it to form a long length of breaker belt material repeated windings being used to provide the required number of encasing cords but preferably the core ply is formed into a ring and the winding is carried out around the ring so as to form a single discrete annular breaker belt having the required diameter and width for a tire. In the latter case the winding is carried out several times around the ring until the required number of encasing cords is in position.

The core ply for this may be prepared by joining end-to-end a strip of breaker reinforcement fabric or may be formed by winding a reinforcement cord or a narrow strip of reinforcement cords embedded in elastomeric material onto a drum so that the reinforced core ply has no end-to-end joint across it. The core ply may then be mounted around a pair of spaced-apart drive and support rollers and the encasing cord is wound around the core ply between the rollers with the rollers being rotated so as to give the required spacing to successive windings of the reinforcement cords.

The invention also includes a tire incorporating a breaker belt of the type described and claimed in the present application.

Further aspects of the invention will be made apparent in the following description, by way of example only, of embodiments in conjunction with the attached diagrammatic drawings in which:

FIG. 1 is a cross-sectional view of a first breaker belt;

FIG. 2 is a part plan view of the breaker belt shown in FIG. 1;

FIG. 3 is a cross-sectional view of a second breaker belt;

FIG. 4 is a part plan view of the breaker belt of FIG. 3;

Figure 5:
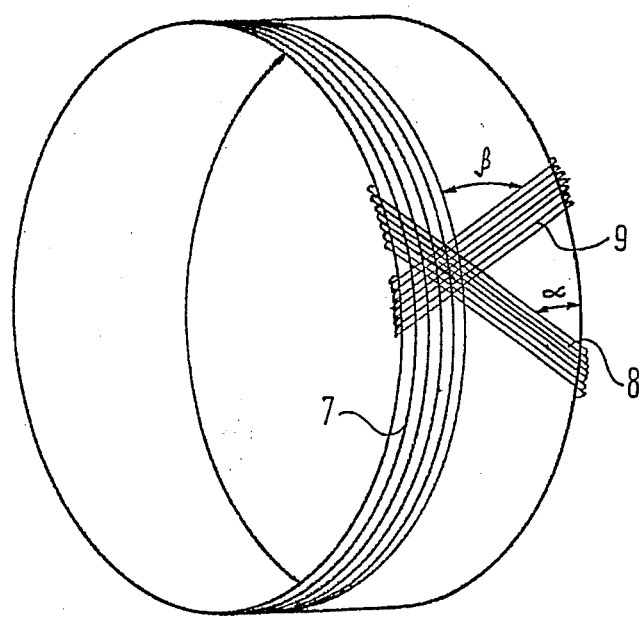
FIG. 5 is a perspective view of the breaker belt of FIGS. 3 and 4 partly assembled.

The breaker belt shown in FIGS. 1 and 2 comprises a core ply 1 formed by a sheet of equally spaced-apart steel tire cords 2 each of which is parallel to the centreline of the breaker belt (i.e. the cords 2 are laid at 0°). The cords 2 are embedded in elastomeric material 3 which is rubber fabric topping compound so that a handleable sheet is provided. Transverse strength for the breaker belt is provided by an encasing ply 4 which comprises a winding of a single steel cord. The single cord is wound around the core ply 1 at an acute angle "A" to the longitudinal centreline of the ply so that each successive turn lies adjacent to the previous turn. The resultant encasing ply thus has upper traversing cords 5 and lower traversing cords 6 both at the same angle A to the same side of the centreline.

The breaker belt shown in FIGS. 3, 4 and 5 again comprises a core ply 7 formed by 0° steel cords spaced-apart across the core ply but in this case two windings are applied to form two separate encasing plies 8 and 9. In this case each ply 8 and 9 is wound at a different angle $\alpha$ and $\beta$, as indicated in FIG. 5. Note that the two sets of cords 8 and 9 above the core ply 7 overlap and the two sets of cords 8A and 9A below the core ply 7 also overlap and a balanced construction is provided. In this embodiment it should also be noted that the 0° core ply is formed as a ring without a conventional overlapping joint and in fact is a continuous winding of a single tire cord laid with each successive turn around the ring adjacent and parallel to the previous winding.

Many variations are possible within the present invention. For example, the core ply may have different spacings between cords at the centre and edges of the core ply (i.e. a variable end count) or different cords may be used at different places across the core ply. The core ply may be of more than one sheet of fabric and may include a ply in which the cords are at an acute angle to the centreline.

The encasing ply or plies must, however, be formed from cords which are continuous and wind round and round the core ply. The embodiments wind a single cord to form each encasing ply but a narrow strip, for example, six cords embedded in elastomeric material may be wound around the core ply.

As described in the embodiments above each cord turn is wound so as to lie adjacent to the previous turn but this is not always essential. Particularly, in the case when the core ply is annular prior to winding the encasing ply it may be advantageous to wind the cord as shown in FIG. 6.

Figure 6:
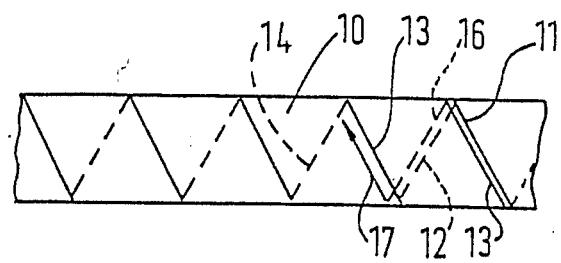
FIG. 6 is a plan view of part of an alternative breaker belt.

In FIG. 6 the core ply is shown as a straight sheet 10 and for clarity the reinforcement cords are not shown. The winding of encasing cord is built up by winding around the sheet laying above the sheet cord 11, then beneath the sheet cord 12, above the sheet cord 13, beneath the sheet cord 14 etc. Each of these cords is laid at an acute angle to the centreline but always towards the same direction which, as shown by arrow 23, is towards the left-hand side of FIG. 6. The encasing ply is thus only outlined by the first winding and a second winding of cord lays 15,16 and 17 is used to begin to fill in the ply. Subsequent windings build up the complete encasing sheet. This construction provides further possible variations in breaker belt design while utilising the wound encasing ply feature of the present invention.

The manufacture for the breaker belt has been partially explained in the above description of some embodiments but it will now be described in more detail.

There are basically two methods. In the first, preferred, method discrete breaker belts are made and will be described by reference to FIGS. 5 and 7.

The first step of the preferred method is to manufacture the core ply 7 by wrapping a thin layer of rubber composition around a drum having the diameter of the required finished core ply. Next a tire cord is wound circumferentially around the drum starting at one side and laying each successive turn next to the previous one to give the required cord spacing across the core ply 7. A second rubber layer is then wound on and the assembly is consolidated.

Figure 7:
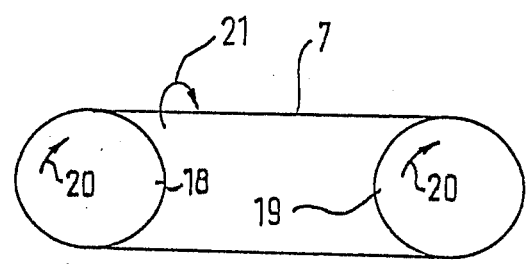
FIG. 7 shows the support system for winding.

The core ply 7 is then taken from the drum 9 (the drum being collapsible) and placed around a pair of spaced-apart winding support drums 18 and 19 as shown in FIG. 7 which are driven stepwise in the directions of arrows 20 while a winding head is rotated around the core ply 7 in the direction of arrow 21. The rate of winding and the stepwise movement are set to give the required encasing ply arrangement. It will be appreciated that several passes of the core ply 7 may be required through the winding head.

The core ply 7 need not be wound from a single end and may be made by other methods including butt joining a length of conventional 0° fabric or a length of bias cut fabric although the wound core ply has the advantage of no joint in the finished breaker belt to cause uniformity difficulties in the tire.

The second, less preferred, method is to make the breaker belting as a continuous long length which is cut into discrete shorter lengths prior to assembling on to a tyre carcass. This uses conventional techniques to form the core ply which is then passed as a straight length of ply material through a winding head or, in the case of more than one encasing ply, optionally through two or more winding heads each of which rotates around the core ply.

In both methods the cords or the encasing ply may be embedded in elastomeric material immediately prior to final consolidation of the breaker belt or may be coated prior to the winding operation.

We claim:

1. A tire with a breaker belt comprising a core ply of elastomeric material reinforced by substantially parallel cords extending longitudinally of the core ply such that the cords are substantially parallel to the mid-circumferential plane of said tire, and two encasing plies, each encasing ply comprising a continuous winding of a single tire cord reinforcement embedded in elastomeric material, said tire cord reinforcement traversing the core ply at an acute angle to said mid-circumferential plane and being wound to position each turn of said winding adjacent to the previous turn around the core ply so that said tire cord reinforcement has upper and lower traversing cords both at the same angle and in the bias direction, the two encasing plies each being wound at a different acute angles relative to the reinforcing cords.

2. The tire of claim 1 wherein the longitudinally extending cords of the core ply are spaced across the width of said core ply according to the required core ply properties.

3. The tire of claim 1 wherein the longitudinally extending cords of the core ply comprise a single cord wound continuously in an annulus.

4. The tire of claim 1 in which the two encasing plies are each wound on opposite bias angles from each other relative to the reinforcing cords of the core.

5. A method of manufacture of a tire with a breaker belt comprising, preparing an annular elastomeric core ply reinforced by substantially parallel cords extending longitudinally of the core ply and substantially parallel to the mid-circumferential plane of the tire, and forming a first encasing ply by winding a first continuous single tire cord reinforcement around the core ply at an acute angle to said mid-circumferential plane to position each turn of the cord adjacent the previous turn around the core ply so that said single cord has upper and lower traverses that are at the same acute angle and in the same bias direction, and forming a second encasing ply by winding a second continuous single cord reinforcement around the core at a different acute angle to the first cord, each turn of the cord being adjacent the previous turn around the core ply, so that the second cord has upper and lower traverses that are at the same different acute angles.

6. A method according to claim 5, wherein the core ply is formed by winding reinforcing cord around a drum so that a single endless cord forms the core ply reinforcement.

7. The method of claim 5 wherein the second cord is wound around the core on an opposite bias angle to the first cord.

* * * * *